Patented Jan. 23, 1940

2,188,104

UNITED STATES PATENT OFFICE 2,188,104

CONDENSATION PRODUCTS OF THE ANTHRAQUINONE SERIES

Fritz Baumann and Heinz-Werner Schwechten, Leverkusen-I. G. Werk, Germany, assignors to General Aniline Works, Inc., New York, N. Y., a corporation of Delaware No Drawing. Application December 29, 1937, Serial No. 182,260. In Germany January 2, 1937

7 Claims. (Cl. 260—326)

The present invention relates to new vat dyestuffs and to the process of preparing the same. In our U. S. application for Letters Patent Ser. No. 179,729, filed December 14, 1937, we have described a process of preparing condensation products of the anthraquinone series and the new products which are obtainable thereby. This process consists in causing to react with benzyl cyanide an anthraquinone substituted in 2-position by a carboxylic acid, carboxylic acid amide, or carboxylic acid ester and having a cyano group in 3-position. The product thus obtained corresponds to the probable formula:

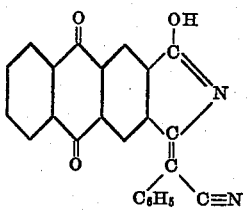

The present invention relates to compounds which are derived from the above-named product of our U. S. application Ser. No. 179,729.

It has been found that valuable vat dyestuffs are obtained by causing to react the aforementioned product with phosphorus pentachloride and then subjecting the chloride thus obtained to the action of an amine containing at least 1 hydrogen atom attached to the nitrogen.

By the action of phosphorous pentachloride, the OH-group in the above formula is replaced by a chlorine atom. This reaction is preferably carried out in the presence of a high boiling indifferent solvent, for instance, nitrobenzene, trichloro benzene, and dichloro benzene. Generally the so formed chloride separates from the reaction mixture in a crystalline state. This chloride shows a high capacity for reacting and forms with amines condensation products, hydrochloric acid being split off thereby. For this reaction amines of any kind may be employed and it is only necessary that they have at least 1 hydrogen attached to the nitrogen atom. As such amines, there may be mentioned alkyl and aryl amines, such as dimethyl amine, monomethyl amine, aniline, monomethyl aniline, and dehydrothiotoluidine. Amines which are derived from compounds which are capable of being vatted are preferred. Amines of that kind are, for instance, 1-amino-anthraquinone, 1-amino-4-benzoylamino-anthraquinone, 1-amino - 5 - benzoylamino-anthraquinone, 1-amino - 4 - chloro-anthraquinone, 1-amino-5-chloro-anthraquinone, 4-amino-anthraquinone-benzacridones, 4-amino-anthraquinone - naphthacridones, α- amino - phthaloyl-carbazoles, and amino-derivatives of anthraquinones in which one of the meso-carbon atoms forms part of a heterocyclic ring system, such as pyrimidine anthrone, pyrimidone-anthrone, pyridone-anthrone, and the N-alkylated substitution products thereof.

It is to be understood that also those products fall within the scope of our present invention which are derived from diamines. Such diamines are, for instance, 1.4- and 1.5-diamino-anthraquinones and 4.4′-, 4.5′-, and 5.5′-diamino-1.1′-anthrimide-carbazoles. These diamines are capable of reacting with one or both amino groups.

The reaction between the chloride and the amine, which is preferably one of the formula: $H_2N.R_1$ ($R_1$ being a radical of a compound selected from the group consisting of anthraquinones, anthraquinone-benzacridones, anthraquinone-naphthacridones, anthraquinone-thioxanthones, phthaloyl-carbazoles, anthrimides, anthrimide-carbazoles, and anthraquinones in which one of the meso-carbon atoms forms part of a heterocyclic ring system) is preferably carried out at an elevated temperature in the presence of a high boiling indifferent solvent such as chloro-toluene, trichloro-benzene, o-dichloro-benzene, nitrobenzene, or chloro-naphthalene. The reaction products separate generally in a crystalline state and have the probable formula:

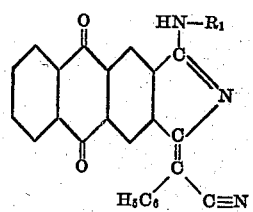

($R_1$ has the above meaning). The compounds obtainable according to the present invention are valuable vat dyestuffs. They may be also employed as starting materials for the preparation of other dyestuffs.

The invention is illustrated by the following examples without being restricted thereto, the parts being by weight.

Example 1

40 parts of the substance obtainable according to our U. S. application Ser. No. 179,729, Example 1, are introduced into 600 parts of trichloro-benzene, then 60 parts of phosphorus-pentachloride are added at a temperature of 150° C. After having strewed phosphorus-pentachloride into the above mixture the temperature is slowly increased to 210° C., while the thus formed phosphorus oxychloride is simultaneously removed. Thereby the difficultly soluble starting material is dissolved giving a yellow color. As soon as a clear solution is obtained it is cooled and the chloride, being crystallized in great lemon-yellow prisms, is filtered by suction at room temperature.

15 parts of 1-amino-5-benzoylamino-anthraquinone are heated in 400 parts of nitrobenzene to 150° C. and, at this temperature, 18 parts of the above described chloride are added to the mixture. The reaction occurs immediately. The condensation product separates in a well crystallized state, hydrochloric acid being evolved. In order to complete the reaction the mixture is quickly heated to boiling.

The difficultly soluble dyestuff is filtered by suction at a temperature of 80° C., washed with nitrobenzene and alcohol and then dried. The brownish red needles dissolve in sulfuric acid with a yellowish brown color. The dyestuff yields on cotton from grass-green vat clear orange to red shades.

When the chloride reacts upon 5-amino-1.8-anthrapyrimidine in the same manner, a dyestuff crystallizing in brown needles is obtained which dissolves in sulfuric acid with a yellowish brown color, yields a green vat, and shows on cotton a strong brownish red.

Example 2

21 parts of the chloride obtainable according to Example 1 are heated to boiling with 19 parts of 4-amino anthraquinone - 2.1'-(N) - 1'.2'-(N) - 5'-chloro-benzacridone which has the structural formula:

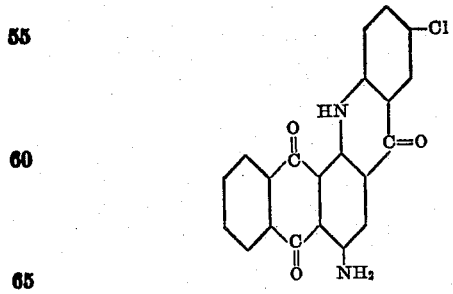

in 600 parts of anhydrous nitrobenzene for about 25 minutes until no starting material is to be found in the microscope. The dyestuff separated in fine needles is filtered by suction, washed, and dried at a temperature of 100° C. The blackish brown crystal powder dissolves in sulfuric acid with yellow color. When the solution is poured into water, olive-brown flakes are separated. The dyestuff thus obtained yields on vegetable fibers from a greyish green vat strong fast olive-colored shades. It has the probable formula:

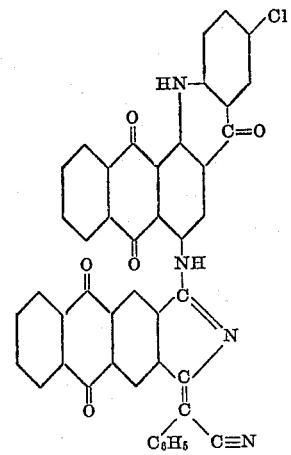

Compounds of similar properties are obtained when 4-amino anthraquinone 2.1-(N)-1'.2'-(N)-benzacridones are used which bear in 4'- and 6'-position or 3'- and 5'-position halogen atoms.

Example 3

28 parts of finely powdered 5-amino-4'-benzoylamino-1.1'-anthrimide-carbazole are suspended in 800 parts of trichlorobenzene and into this mixture 20 parts of the chloride described in Example 1 are introduced at a temperature of 160–170° C. The quickly thickening mixture is stirred until the evolution of hydrochloric acid has ceased. It may be worked up, for instance, by distilling off the solvent in vacuum. The blackish brown powder dyes cotton reddish brown shades.

By using 4-amino-4'-benzoylamino-1.1'-anthrimide-carbazole instead of 5-amino-4'-benzoylamino-1.1'-anthrimide-carbazole a reaction product is obtained which dyes cotton blackish brown shades.

These as well as other acylamino-anthrimide-carbazoles may also be produced by reacting the aforementioned chloride upon, for instance, 1-amino-4-chloro-anthraquinone, substituting the chlorine atom by the residue of amino benzoylanthraquinone in an anthrimide melting, and carbazolating subsequently the anthrimides thus formed.

Example 4

19 parts of 4-amino-1.2-anthraquinone-o-chloro-phenylimidazole and 22 parts of the chloride obtainable according to Example 1 are heated to boiling in 700 parts of nitrobenzene for a short time while stirring. The difficultly soluble reaction product separates, forming reddish brown needles. It is filtered with suction at a temperature of 90° C., washed with nitrobenzene and ethyl alcohol and then dried. The dyestuff dyes vegetable fibers from an olive-green vat fast reddish brown shades.

Example 5

19 parts of 1.5-diamino-anthraquinone are caused to react with 68 parts of the chloride obtainable according to Example 1 by heating in nitrobenzene to a temperature of 200° C. The reaction product separates in a crystalline state and dyes cotton from a green vat reddish brown shades.

Example 6

10 parts of the chloride obtainable according to Example 1 are heated with 50 parts of dimethyl-amine of 40 per cent and 30 parts of pyridine in a bomb tube to a temperature of 100° C., until the yellow needles of the chloride have disappeared. The reaction product which separates in beautiful reddish brown needles yields a green vat in pyridine water-alkali lye and dissolves in glacial acetic acid-hydrochloric acid with a yellow color.

Example 7

1 part of the chloride obtainable according to Example 1 is heated to boiling in 20 parts of aniline, whereby the yellow crystals of the starting material are dissolved with a reddish brown color. While cooling the solution, the thus formed anilide separates in beautiful red needles. It dissolves in pyridine water with a green color, when caustic soda solution is added.

A compound of similar properties is obtained, when molar quantities of the chloride according to Example 1 are heated with dehydrothiotoluidine in nitrobenzene to a temperature of 200 C.

We claim:

1. The products which are obtained by reacting benzyl cyanide with an anthraquinone substituted in 2-position by a radical selected from the group consisting of carboxylic acid, carboxylic acid amide, and carboxylic acid ester and having a cyano group in 3-position, subjecting the reaction product obtained to the action of phosphorus pentachloride and then reacting this product at an elevated temperature and in the presence of an indifferent solvent with an amine containing at least one hydrogen atom attached to the nitrogen, these products corresponding to the following probable formula

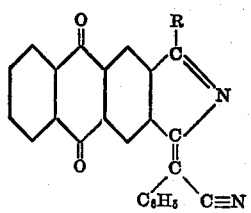

wherein R stands for a substituted amino group.

2. The products which are obtained by reacting benzyl cyanide with an anthraquinone substituted in 2-position by a radical selected from the group consisting of carboxylic acid, carboxylic acid amide, and carboxylic acid ester and having a cyano group in 3-position, subjecting the reaction product obtained to the action of phosphorus pentachloride and then reacting this product at an elevated temperature and in the presence of an indifferent solvent with a primary amine, these products corresponding to the probable formula

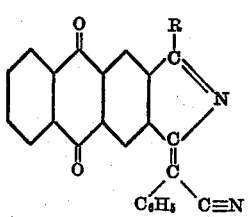

wherein R stands for an amino group being once substituted.

3. The products which are obtained by reacting benzyl cyanide with an anthraquinone substituted in 2-position by a radical selected from the group consisting of carboxylic acid, carboxylic acid amide, and carboxylic acid ester and having a cyano group in 3-position, subjecting the reaction product obtained to the action of phosphorus pentachloride and then reacting this product at an elevated temperature and in the presence of an indifferent solvent with an amine being substituted by a radical selected from the group consisting of alkyl and aryl, these products corresponding to the probable formula

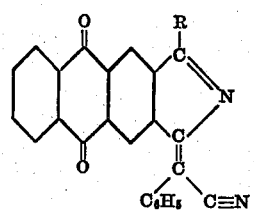

wherein R has the above meaning.

4. The products which are obtained by reacting benzyl cyanide with an anthraquinone substituted in 2-position by a radical selected from the group consisting of carboxylic acid, carboxylic acid amide, and carboxylic acid ester and having a cyano group in 3-position, subjecting the reaction product obtained to the action of phosphorus pentachloride and then reacting this product at an elevated temperature and in the presence of an indifferent solvent with a primary amine selected from the group consisting of primary alkyl and aryl amines, these products corresponding to the probable formula

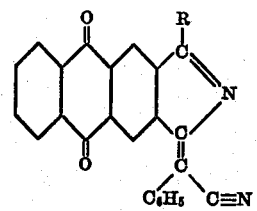

wherein R has the above meaning.

5. The products which are obtained by reacting benzyl cyanide with an anthraquinone substituted in 2-position by a radical selected from the group consisting of carboxylic acid, carboxylic acid amide, and carboxylic acid ester, and having a cyano group in 3-position, subjecting the reaction product obtained to the action of phosphorus pentachloride and then reacting this product at an elevated temperature and in the presence of an indifferent solvent with an amine of the general formula $H_2N \cdot R_1$ wherein $R_1$ stands for a radical of a compound capable of being vatted, these products corresponding to the probable formula

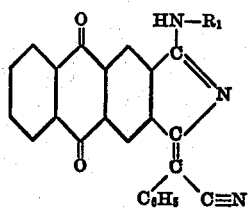

wherein $R_1$ has the above meaning.

6. The products which are obtained by reacting benzyl cyanide with an anthraquinone substituted in 2-position by a radical selected from the group consisting of carboxylic acid, carboxylic acid amide, and carboxylic acid ester and having a cyano group in 3-position, subjecting the reaction product obtained to the action of phosphorus pentachloride and then reacting this product at an elevated temperature and in the presence of an indifferent solvent with an amine of the general formula $H_2N \cdot R_1$ wherein $R_1$ stands for a radical of a compound selected from the group consisting of anthraquinones, anthraquinone-benzacridones, anthraquinone-naphthacridones, anthraquinone-thioxanthones, phthaloyl-carbazoles, anthrimides, anthrimide-carbazoles, and anthraquinones in which one of the meso-carbon atoms forms part of a heterocyclic ring system, these products corresponding to the probable formula

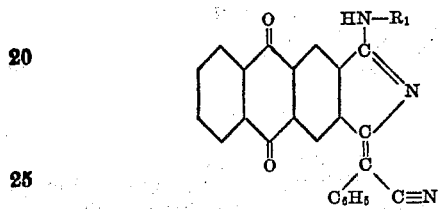

wherein $R_1$ has the above meaning.

7. The product which is obtained by reacting benzyl cyanide with an anthraquinone substituted in 2-position by a radical selected from the group consisting of carboxylic acid, carboxylic acid amide, and carboxylic acid ester and having a cyano group in 3-position, subjecting the reaction product obtained to the action of phosphorus pentachloride and then reacting this product at an elevated temperature and in the presence of an indifferent solvent with an amine of the following formula:

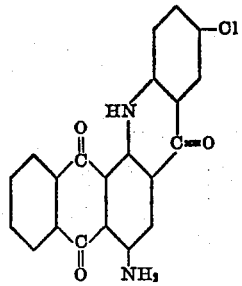

this product corresponding to the probable formula

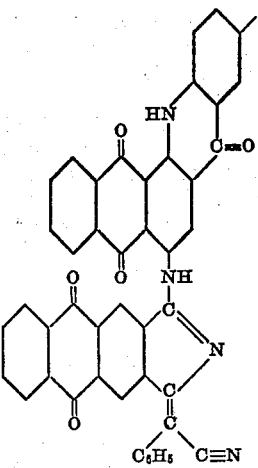

FRITZ BAUMANN.
HEINZ-WERNER SCHWECHTEN.